(12) United States Patent
Birkenhauer et al.

(10) Patent No.: US 12,210,118 B2
(45) Date of Patent: Jan. 28, 2025

(54) RADAR TARGET SIMULATOR WITH CONTINUOUS DISTANCE EMULATION AND CORRESPONDING SIMULATION METHOD

(71) Applicant: Rohde & Schwarz GmbH & Co. KG, Munich (DE)

(72) Inventors: Christoph Birkenhauer, Erlangen (DE); Gerhard Hamberger, Griesstaett (DE); Matthias Beer, Neubiberg (DE); Maximilian Bogner, Munich (DE); Steffen Neidhardt, Dorfen (DE); Benedikt Simper, Munich (DE); Marius Brinkmann, Arnsberg (DE); Christian Carlowitz, Nuremberg (DE); Patrick Stief, Nuremberg (DE); Georg Körner, Schluesselfeld (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 422 days.

(21) Appl. No.: 17/079,674

(22) Filed: Oct. 26, 2020

(65) Prior Publication Data
US 2022/0107389 A1    Apr. 7, 2022

(30) Foreign Application Priority Data
Oct. 6, 2020 (EP) .................................... 20200173

(51) Int. Cl.
*G01S 7/40*    (2006.01)

(52) U.S. Cl.
CPC .............. *G01S 7/4056* (2013.01); *G01S 7/40* (2013.01); *G01S 7/4095* (2021.05)

(58) Field of Classification Search
CPC . G01S 7/40; G01S 7/4095; G01S 7/03; G01S 7/4052; G01S 7/4056
(Continued)

(56) References Cited

U.S. PATENT DOCUMENTS 3,341,849 A * 9/1967 Cordry ................. G01S 13/345
342/128
4,107,679 A * 8/1978 Strauch .................... H03C 3/09
342/87
(Continued)

FOREIGN PATENT DOCUMENTS

CN    102590794    7/2012
CN    102778673    11/2012
(Continued)

OTHER PUBLICATIONS

Y. K. Kwag, Y. C. Park, S. C. Park and B. G. Choi, "Real-time complex signal simulation technique for the multi-mode radar signal processor," Proceedings of International Radar Conference, 1996, pp. 620-624, doi: 10.1109/ICR.1996.574553. (Year: 1996).*

*Primary Examiner* — Timothy A Brainard
(74) *Attorney, Agent, or Firm* — Potomac Technology Law, LLC

(57) ABSTRACT

A radar target simulator with no lower target distance limitation and continuous distance emulation is provided. Said radar target simulator comprises a receiving unit configured to receive a radar signal from a radar under test and to provide a corresponding receive signal, and a ramp slope estimating unit. In this context, the ramp slope estimating unit is configured to track the ramp slope of the radar under test on the basis of the receive signal.

13 Claims, 3 Drawing Sheets

(58) Field of Classification Search
USPC .......................................................... 342/171
See application file for complete search history.

(56) References Cited

U.S. PATENT DOCUMENTS

| | | | | |
|---|---|---|---|---|
| 4,661,818 A * | 4/1987 | Riffiod | ................. | G01S 7/4056 |
| | | | | 342/172 |
| 4,679,049 A * | 7/1987 | Riffiod | ................. | G01S 7/4056 |
| | | | | 342/172 |
| 6,075,480 A * | 6/2000 | Deliberis, Jr. | ........ | G01S 7/4052 |
| | | | | 342/194 |
| 2018/0060467 A1 | 3/2018 | Schulte et al. | | |
| 2022/0003838 A1* | 1/2022 | Itkin | ................... | G01S 7/4021 |

FOREIGN PATENT DOCUMENTS

| | | | |
|---|---|---|---|
| CN | 103048650 | | 4/2013 |
| CN | 103529433 | | 1/2014 |
| CN | 105403870 | | 3/2016 |
| CN | 107346018 | | 11/2017 |
| CN | 107831479 | | 3/2018 |
| CN | 108983240 | | 12/2018 |
| CN | 109061581 | | 12/2018 |
| CN | 109946691 | | 6/2019 |
| DE | 102014223990 A1 * | | 5/2016 |
| FR | 2747788 A1 | | 10/1997 |
| JP | 2017166940 | | 9/2017 |
| WO | WO2020136279 A1 | | 7/2020 |

\* cited by examiner

RADAR TARGET SIMULATOR WITH CONTINUOUS DISTANCE EMULATION AND CORRESPONDING SIMULATION METHOD

PRIORITY

This application claims the earlier filing date under 35 U.S.C. 119(a) from European Patent Application EP20200173.1 filed on Oct. 6, 2020, the entirety of which is incorporated by reference herein.

TECHNICAL FIELD

The invention relates to a radar target simulator with no lower target distance limitation and continuous distance emulation and a radar target simulation method with no lower distance limitation and continuous distance emulation.

BACKGROUND

Generally, in times of an increasing number of applications employing radar systems such as autonomous vehicles, there is a growing need of a radar target simulator with no lower target distance limitation and continuous distance emulation and a radar target simulation method with no lower distance limitation and continuous distance emulation in order to ensure a correct functioning of such applications especially on the basis of highly accurate and efficient measurement and testing.

U.S. Pat. No. 4,661,818 A relates to a delay-simulator for testing a radio altimeter of the type which emits a frequency-modulated wave, the modulation being according to linear segments of slope p, and which compares the frequencies of the emitted wave and of the wave which is received after reflection to provide a distance measurement. The delay-simulator is connected between the transmitting antenna and the receiving antenna of the altimeter, and comprises two signal-processing chains which are arranged, in parallel, between a receiving section and a single-sideband mixer, the output terminal of which is connected to a transmitting section. The first chain is formed by first devices, which generate a quantity G, which is proportional to p, and second devices, which generate a signal possessing a frequency fd, the ratio of fd and G assuming a predetermined, adjustable ratio, Q. The second chain is formed by a coupler which is connected to a variable attenuator. The single-sideband mixer beats substractively between the two signals which it receives. Furthermore, it is the object of said delay-simulator "to simulate, for a distance-measuring apparatus of the FM-CW type, all the altitudes included within a range of distances covering several km, or even several tens of km, in steps of a value ranging between a few tens of cm and several m" (see column 2, lines 4 to 8). Disadvantageously, in accordance with said object, said delay-simulator does not allow for a radar target simulation with no lower target distance and continuous distance emulation.

Accordingly, there is a need to provide a radar target simulator with no lower target distance limitation and continuous distance emulation and a radar target simulation method with no lower distance limitation and continuous distance emulation, which allow for highly accurate and efficient measurements or testing, respectively.

SUMMARY

Embodiments of the present invention advantageously address the foregoing requirements and needs, as well as others, by providing a radar target simulator with no lower target distance limitation and continuous distance emulation and a radar target simulation method with no lower distance limitation and continuous distance emulation, which allow for highly accurate and efficient measurements or testing, respectively.

According to a first aspect of the invention, a radar target simulator with no lower target distance limitation and continuous distance emulation is provided. Said radar target simulator comprises a receiving unit configured to receive a radar signal from a radar under test and to provide a corresponding receive signal, and a ramp slope estimating unit. In this context, the ramp slope estimating unit is configured to track the ramp slope of the radar under test on the basis of the receive signal as tracking information. Advantageously, this allows for highly accurate and efficient measurements or testing, and for performing the tracking continuously and/or in real-time or nearly in real-time.

According to a first implementation form of the first aspect of the invention, the ramp slope estimating unit is configured to determine the corresponding frequency slope and/or the corresponding direction based on the tracking information. Advantageously, for instance, direction can be positive or negative, which allows for a high flexibility.

According to a second implementation form of the first aspect of the invention, the radar target simulator comprises a first delay unit configured to delay the receive signal according to a first delay time. Advantageously, for example, the first delay time may be generated with the aid of digital and/or analog means comprising at least one of an electrical, acoustical, optical delay line, a field programmable gate array (FPGA), or any combination thereof.

According to a further implementation form of the first aspect of the invention, the radar target simulator comprises a first mixer for applying a Doppler frequency. Advantageously, the Doppler frequency can thereby be applied in a particularly efficient manner. Further advantageously, the first mixer may be implemented in a digital manner. For instance, the first mixer may be implemented as a mixing stage of an FPGA. In this context, it is noted that this may analogously apply for further mixers.

According to a further implementation form of the first aspect of the invention, the ramp slope estimating unit comprises a second delay unit for delaying the receive signal according to a second delay time. In addition to this or as an alternative, the ramp slope estimating unit comprises a complex output for providing corresponding phase information on the basis of the tracking information. Advantageously, for example, the second delay time may be generated with the aid of digital and/or analog means comprising at least one of an electrical, acoustical, optical delay line, or any combination thereof. Further advantageously, the complex output providing corresponding phase information may allow for a determination of the respective positive and negative slope delay time.

According to a further implementation form of the first aspect of the invention, the ramp slope estimating unit comprises a second mixer for mixing the receive signal with a delayed version of the receive signal. Advantageously, for instance, accuracy can thereby be increased in an efficient manner. Further advantageously, said delayed version of the receive signal may be generated on the basis of the second delay time. In other words, the delayed version of the receive signal may be generated with the aid of the second delay unit.

According to a further implementation form of the first aspect of the invention, the ramp slope estimating unit comprises a frequency estimating unit, such as a Fourier transformation unit, for applying a Fourier transform, such as a discrete Fourier transform, to a signal resulting from mixing the receive signal with a delayed version of the receive signal. Advantageously, for example, inaccuracies can thereby be reduced further. Further, additionally or alternatively, the frequency estimating unit may be configured to estimate the respective frequency on the basis of corresponding phase information of the respective beat signal after mixing with the aid of the second mixer. In addition or as an alternative, the frequency estimating unit may be configured to apply a Fourier transform with an argumentum maximi estimation or function.

According to a further implementation form of the first aspect of the invention, the radar target simulator comprises a signal generation unit configured to set a modulation frequency on the basis of the tracking information and/or the corresponding direction and/or the corresponding radar target distance. Advantageously, for instance, both accuracy and efficiency can thereby be further increased.

According to a further implementation form of the first aspect of the invention, the signal generation unit may be composed of a controlled oscillator, such as a numerically controlled oscillator or a voltage-controlled oscillator. In addition to this or as an alternative, the modulation frequency is set on the basis of a relation between the ramp slope of the radar under test and a respective processing time of the radar target simulator. Advantageously, for example, the signal generation unit can thereby be implemented in a cost-efficient manner. Further advantageously, additionally or alternatively, the signal generation unit may comprise multiple controlled oscillators, such as multiple numerically controlled oscillators or multiple voltage-controlled oscillators, for multiple targets or the simulation thereof, respectively.

According to a further implementation form of the first aspect of the invention, the signal generation unit is configured in a manner that it behaves like a frequency-shifting unit for creating Doppler effects. Advantageously, for instance, simulation of moving radar targets may thereby not be limited to stationary radar targets.

According to a further implementation form of the first aspect of the invention, the signal generation unit is configured to shift the respective radar target towards the corresponding beat frequency and/or towards the corresponding radar target range by setting the modulation frequency. In addition to this or as an alternative, the modulation frequency may be based on the result of a multiplication of the ramp slope of the radar under test by the difference between the respective processing time of the radar target simulator and the respective real radar target time. Advantageously, for example, due to the fact that the respective beat signal is relatively small in frequency, there is no need for the usage of high capability components, which additionally reduces costs.

According to a further implementation form of the first aspect of the invention, the radar target simulator comprises an amplifying unit, such as an adjustable amplifying unit, configured to set a gain with respect to a response signal to be transmitted to the radar under test. Advantageously, for instance, with the aid of said gain, a radar cross section of the respective radar target can be adjusted in an accurate and efficient manner. Further advantageously, the radar target simulator may comprise an attenuation unit configured to set an attenuation with respect to a response signal to be transmitted to the radar under test.

According to a further implementation form of the first aspect of the invention, the radar target simulator comprises a transmitting unit configured to transmit a response signal to be transmitted to the radar under test. Advantageously, for example, at least a part of the transmitting unit and the receiving unit can thereby be based on the same components, which additionally reduces costs and achieves increased efficiency.

According to a further implementation form of the first aspect of the invention, the receiving unit comprises at least one of an antenna, a third mixer, an analog-to-digital converter, or any combination thereof. In addition to this or as an alternative, the transmitting unit comprises at least one of an antenna, a fourth mixer, a digital-to-analog converter, or any combination thereof. Advantageously, for instance, the receiving unit and/or the transmitting unit can thereby be implemented in a simple manner, reducing inefficiencies.

According to a second aspect of the invention, a radar target simulation method with no lower target distance limitation and continuous distance emulation is provided. Said radar target simulation method comprises the steps of receiving a radar signal from a radar under test, providing a corresponding receive signal, and tracking the ramp slope of the radar under test, where the tracking is based on the receive signal used as tracking information. Advantageously, this allows for performing the tracking continuously and/or in real-time or nearly in real-time.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Exemplary embodiments of the invention are now further explained with respect to the drawings by way of example only, and not for limitation. In the drawings.

DETAILED DESCRIPTION

A radar target simulator with no lower target distance limitation and continuous distance emulation and a radar target simulation method with no lower distance limitation and continuous distance emulation, which allow for highly accurate and efficient measurements or testing are provided. In the following description, for the purposes of explanation, numerous specific details are set forth in order to provide a thorough understanding of the invention. It is apparent, however, that the invention may be practiced without these specific details or with an equivalent arrangement. In other instances, well-known structures and devices are shown in block diagram form in order to avoid unnecessarily obscuring the invention.

A processor, unit, module or component (as referred to herein) may be composed of software component(s), which are stored in a memory or other computer-readable storage medium, and executed by one or more processors or CPUs of the respective devices. A module or unit may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the methods, processes and approaches described herein may be processor-implemented using processing circuitry that may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in computer memory storage.

Figure 1:
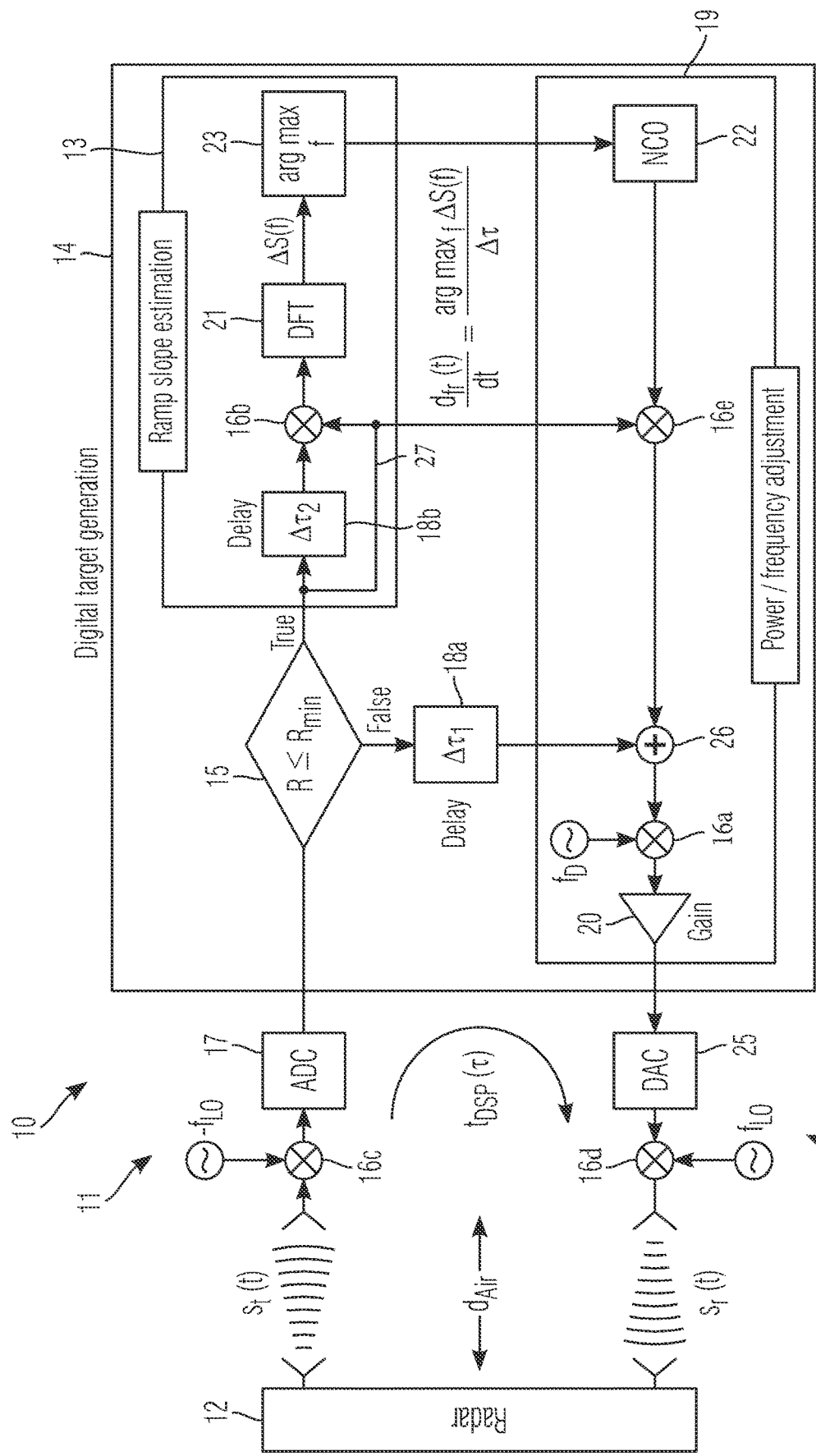
FIG. 1 shows an exemplary embodiment of an inventive radar target simulator or essential parts thereof, respectively.

With respect to FIG. 1, a block diagram of an exemplary embodiment of an inventive radar target simulator 10 or some exemplary parts thereof, respectively, with no lower target distance limitation and continuous distance emulation is shown. According to FIG. 1, the radar target simulator 10 comprises a receiving unit 11 configured to receive a radar signal from a radar under test 12 and to provide a corresponding receive signal.

In addition to this, the radar target simulator 10 comprises a ramp slope estimating unit 13 configured to track the ramp slope of the radar under test 12 use of the receive signal as tracking information. As it can further be seen from FIG. 1, the radar target simulator 10 comprises a digital target generation unit 14, wherein the ramp slope estimating unit 13 may contain the digital target generation unit 14.

Generally, the complete target generation unit or back-end may be implemented as a digital system or unit as the above-mentioned digital target generation unit 14. Further, the target generation unit or target generation back-end, could be completely analog, as well as a mixed analog/digital implementation.

Moreover, the receiving unit 11 comprises an antenna or an antenna array, a mixer 16c, and an analog-to-digital converter 17. In this context, a down-conversion is performed with the aid of the mixer 16c after the antenna or antenna array for a simpler handling of the corresponding signal in the baseband region. In addition to this, the above-mentioned analog-to-digital converter 17 performs the respective conversion from analog to digital signal domain.

Exemplarily, the digital target generation unit 14 may comprise a decision unit 15 configured to decide if the receive signal should be passed to a first delay unit 18a or to the ramp slope estimating unit 13.

The first delay unit 18a is configured to delay the receive signal according to a first delay time $\Delta \tau_1$ which sets the respective target distance.

Again, the decision 15 is configured to pass the corresponding receive signal to the first delay unit 18a in the case that the corresponding target distance R is larger than a minimum target distance $R_{min}$. Otherwise, if the corresponding target distance R is lower or equal to said minimum target distance $R_{min}$, the decision unit 15 is configured to pass the corresponding receive signal to the ramp slope estimating unit 13, to a second delay unit 18b thereof. Furthermore, if the corresponding target distance R is lower or equal to the minimum target distance $R_{min}$, the respective frequency modulation of the radar under test may thereby be tracked.

Advantageously, a priori information about the respective modulation scheme is not necessary due to on-the-fly tracing of the frequency modulation. With respect to the minimum target distance $R_{min}$, it is noted that $R_{min}$ preferably is the shortest distance which may be set by the radar target simulator 10 or the digital target generation unit 14. This value may be driven by the respective internal minimum delay time. Advantageously, $R_{min}$ does not comprise a lower bound or an upper bound. Accordingly, the radar target simulator 10 thereby allows for a full control over all generated radar target signal properties at the same time.

Further advantageously, moving radar targets generated by the radar target simulator 10 may be approximated as being as close in distance as zero meters. In this context, even for the distance of the physical air gap between the radar under test 12 and the radar target simulator 10, there is no limitation. For instance, this helps determine the respective radar behavior just before a collision.

Again, with respect to the ramp slope estimating unit 13 is configured to determine the corresponding frequency slope and/or the corresponding direction on the basis of information from the tracking of the ramp slope of the radar under test 12. As it can further be seen from FIG. 1, the ramp slope estimating unit 13 comprises the above-mentioned second delay unit 18b for delaying the receive signal according to a second delay time $\Delta \tau_2$. Furthermore, the ramp slope estimating unit 13 comprises a mixer 16b for mixing the receive signal with a delayed version of the receive signal, such as the $\Delta \tau_2$-delayed version of the receive signal.

Moreover, the ramp slope estimating unit 13 comprises a discrete Fourier transformation unit 21 for applying a Fourier transform, such as a discrete Fourier transform, to a signal resulting from mixing the receive signal with the delayed version of the receive signal. It is noted that the ramp slope estimating unit 13 may comprise a complex output for providing corresponding phase information preferably on the basis of the tracking information.

It is further noted that, the ramp slope of the radar under test is tracked by the ramp slope estimating unit via the second delay unit 18b, the additional mixing stage 16b, and the discrete Fourier transformation unit 21. This tracking information is fed to a signal generation unit, which may be implemented in the form of a numerically controlled oscillator 22. Further, an argumentum maximi function unit 23 may be connected upstream from the numerically controlled oscillator 22, as exemplarily shown.

Accordingly, the radar target simulator 10 or the ramp slope estimating unit 13 may comprise an argumentum maximi function unit. In this exemplary case, the ramp slope estimating unit 13 comprises the argumentum maximi function unit 23.

The numerically controlled oscillator 22 is exemplarily configured to generate an offset frequency in order to shift the corresponding radar target towards the desired beat frequency and/or towards the desired radar target range. In this context, the radar target simulator 10 may be configured to mix said offset frequency generated by the signal generation unit or the numerically controlled oscillator 22 with the receive signal.

Again, the transmit path 19 comprises a mixer 16a for applying a Doppler frequency, and comprises an amplifying unit, such as an adjustable amplifying unit 20, configured to set a gain with respect to a response signal to be transmitted to the radar under test.

With respect to said gain, with the aid of setting this gain, the respective radar cross section of the corresponding radar target may be adjusted. Moreover, the transmit path 19 comprises a transmitting unit 24 configured to transmit a response signal to be transmitted to the radar under test 12.

Exemplarily, said transmitting unit 24 comprises an antenna or an antenna array, a mixer 16d, a digital-to-analog converter 25. Said digital-to-analog converter 25 performs the respective conversion to an analog signal which is up-converted to the radio frequency region by the mixer 16d.

With respect to the above-mentioned transmit path 19, it is noted that an output of the signal generation unit or the numerically controlled oscillator 22 may be connected to a first input of a mixer 16e, whereas a second input of said mixer 16e may be provided with the signal 27 which also serves as the input to the second delay unit 18b. Furthermore, an output of the mixer 16e may be connected to a first input of an adder 26, whereas a second input of said adder 26 may be connected to an output of the first delay unit 18a. Moreover, an output of the adder 26 may be connected to an input of the above-mentioned mixer 16a, whereas an output of said mixer 16a may be connected to an input of the above-mentioned amplifier 20.

In the context of the invention, it is generally noted that other implementations could comprise different forms to create the delay, i.e., the first delay time and/or the second delay time. Therefore, signal samples of different time steps may thereby be created. In this context, cost efficient analog components may comprise optical delay lines with directly modulated lasers, surface acoustic wave-delay elements, bulk acoustic wave-delay elements, simple wires especially with a defined length, or any combination thereof.

Figure 2:
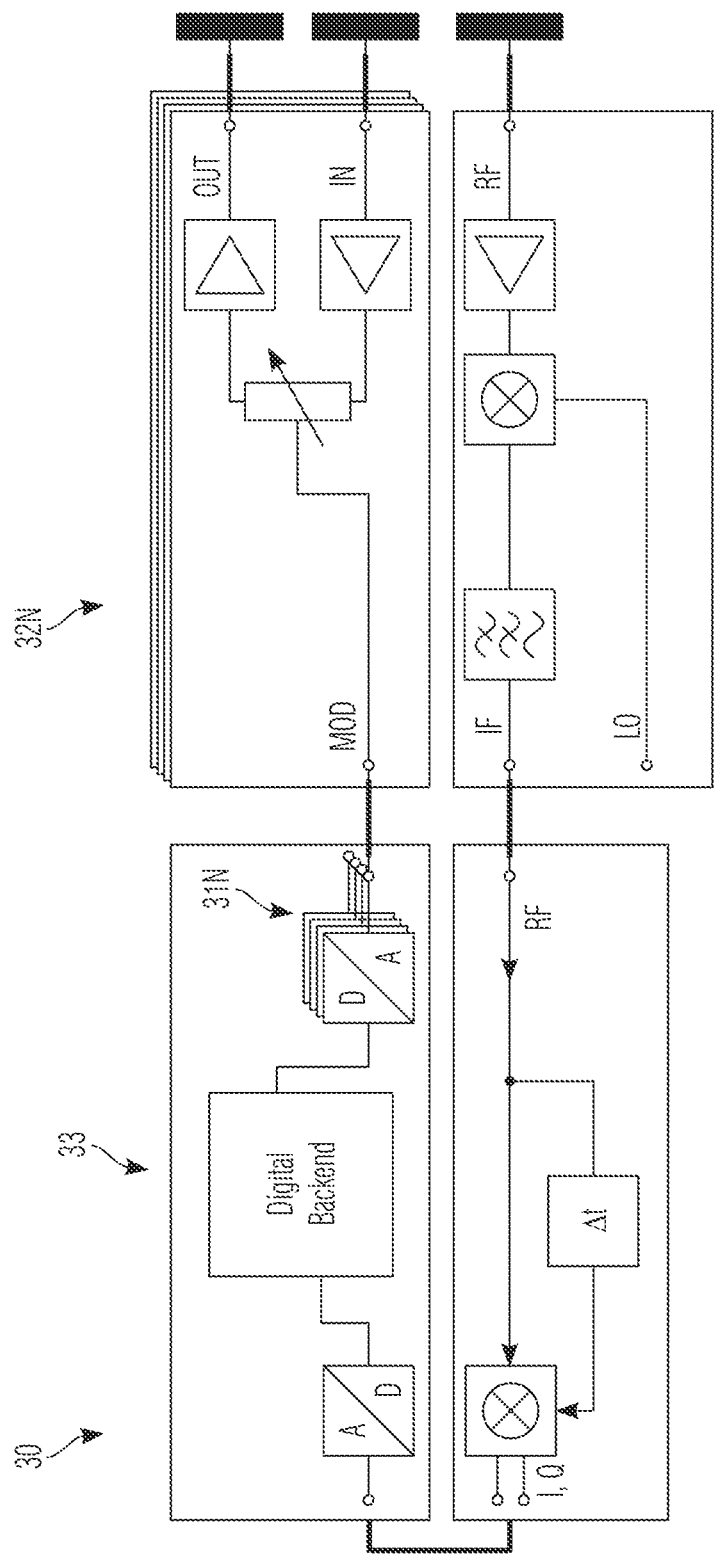
FIG. 2 shows an exemplary embodiment of the first aspect of the invention as a whole.

Now, with respect to FIG. 2, an exemplary embodiment of the inventive radar target simulator 30 is depicted as a whole and in an abstracted manner in comparison to the exemplary embodiment according to FIG. 1.

Advantageously, in this context, the demands for the digital backend 33 can be reduced as less bandwidth is required for processing due to the incorporation of a backscatter transponder and/or the usage of an (external) analog mixer.

In the context of the embodiment according to FIG. 2, it is further noted that in the case of the implementation of multiple transponders, the respective radar target simulator 30 may comprise multiple digital-to-analog converters 31N—instead of the single digital-to-analog converter 25 of the first exemplary embodiment of the radar target simulator 10 according to FIG. 1—and multiple corresponding elements as illustrated by the multiple blocks 32N.

This option would advantageously allow the creation of targets with different angle of arrival. Furthermore, for each angle of arrival, a respective digital-to-analog converter and/or transponder may be employed.

In addition to this, the digital backend 33 may provide several interfaces, such as at least one of an universal serial bus (USB) interface, an inter-integrated circuit (I2C) interface, an Ethernet (Eth) interface, a parallel (PAR) interface, a serial peripheral interface (SPI), or any combination thereof.

Accordingly, with respect to both embodiments according to FIG. 1 and FIG. 2, the purpose of said embodiments is to track the respective frequency modulation and to apply this information for modulation in order to shift the frequency towards the set radar target distance.

In this context, for example, on the basis of the ramp slope of a frequency modulated continuous wave radar and the delay time of the digital back-end, an offset frequency or a modulation frequency may be derived. Furthermore, said offset frequency may be applied to the current receiving frequency. It is further noted that the respective complex output is configured to provide the corresponding phase information, wherein said phase information may provide the corresponding direction.

Advantageously, said offset frequency or said modulation frequency may be set by the ramp slope and/or the corresponding direction and/or the corresponding radar target distance. Further advantageously, the offset frequency or the modulation frequency may be applied to the respective real-time frequency in order to get the desired response. Furthermore, the respective Doppler shifter may be configured to give the corresponding relative speed of the respective radar targets.

Figure 3:
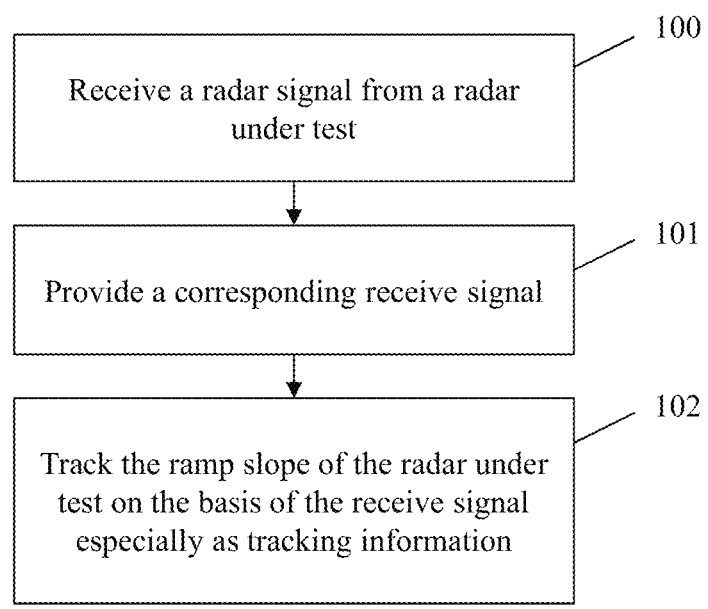
FIG. 3 shows a flow chart of an embodiment of the second aspect of the invention.

Finally, FIG. 3 shows a flow chart of an embodiment of the inventive radar target simulation method with no lower target distance limitation and continuous distance emulation. In a first step 100, a radar signal is received from a radar under test. Then, in a second step 101, a corresponding receive signal is provided. Furthermore, in a third step 102, the ramp slope of the radar under test is tracked on the basis of the receive signal as tracking information.

The radar target simulation method may further comprise the step of determining the corresponding frequency slope and/or the corresponding direction on the basis of the tracking information. In addition to this or as an alternative, the radar target simulation method may comprise the step of delaying the receive signal according to a first delay time.

In addition to this or as an alternative, the radar target simulation method may comprise the step of applying a Doppler frequency. Additionally or alternatively, the radar target simulation method may comprise the step of delaying the receive signal according to a second delay time.

The radar target simulation method may further comprise the step of providing corresponding phase information on the basis of the tracking information with the aid of a complex output. In addition to this or as an alternative, the radar target simulation method may further comprise the step of mixing the receive signal with a delayed version of the receive signal.

Additionally or alternatively, the radar target simulation method may comprise the step of applying a Fourier transform, such as a discrete Fourier transform, to a signal resulting from mixing the receive signal with a delayed version of the receive signal.

In addition to this or as an alternative, the radar target simulation method may comprise the step of setting a modulation frequency on the basis of the tracking information and/or the corresponding direction and/or the corresponding radar target distance with the aid of a signal generation unit.

In this context, the signal generation unit may comprise or be a controlled oscillator, such as a numerically controlled oscillator or a voltage-controlled oscillator. In addition to this or as an alternative, the modulation frequency may be set on the basis of a relation between the ramp slope of the radar under test and a respective processing time of the radar target simulator.

Furthermore, the radar target simulation method may comprise the step of configuring the signal generation unit in a manner that it behaves like a frequency-shifting unit for creating Doppler effects. In addition to this or as an alternative, the radar target simulation method may comprise the step of configuring the signal generation unit to shift the respective radar target towards the corresponding beat frequency and/or towards the corresponding radar target range by setting the modulation frequency.

Additionally or alternatively, the modulation frequency may be based on a multiplication of the ramp slope of the radar under test by the difference of the respective processing time of the radar target simulator and the respective real radar target time.

Additionally or alternatively, the radar target simulation method may comprise the step of shifting the radar target towards the corresponding beat frequency and/or towards the corresponding radar target range based on the modulation frequency.

In addition to this or as an alternative, the radar target simulation method may comprise the step of setting a gain with respect to a response signal to be transmitted to the radar under test with the aid of an amplifying unit, such as an adjustable amplifying unit. The radar target simulation method may further comprise the step of transmitting a response signal for transmission to the radar under test.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A radar target simulator with no lower target distance limitation and continuous distance emulation, the radar target simulator comprising:
   a receiver configured to receive a radar signal from a radar under test and to provide a corresponding receive signal;
   a ramp slope estimating unit configured to generate tracking information by tracking the ramp slope of the radar under test based on the receive signal, wherein the ramp slope estimating unit comprises a complex output configured to provide corresponding phase information based on the tracking information;
   a first delay unit configured to delay the receive signal according to a first delay time ($\Delta\tau_1$); and
   a decision unit configured to determine whether the receive signal should be passed to the first delay unit or to the ramp slope estimating unit.

2. The radar target simulator according to claim 1, wherein the ramp slope estimating unit is configured to determine a corresponding frequency slope and/or a corresponding direction based on the tracking information.

3. The radar target simulator according to claim 1, wherein the radar target simulator comprises a first mixer configured to apply a Doppler frequency.

4. The radar target simulator according to claim 1, wherein the ramp slope estimating unit comprises a second delay unit configured to delay the receive signal according to a second delay time ($\Delta\tau_2$).

5. The radar target simulator according to claim 1, wherein the ramp slope estimating unit comprises a second mixer configured to mix the receive signal with a delayed version of the receive signal.

6. The radar target simulator according to claim 1, wherein the ramp slope estimating unit comprises a frequency estimating unit configured to apply a Fourier transform to a signal resulting from mixing the receive signal with a delayed version of the receive signal.

7. The radar target simulator according to claim 1, wherein the radar target simulator comprises a signal generator configured to set a modulation frequency based on the tracking information, wherein the modulation frequency is applied to a respective real-time frequency, and/or, a corresponding direction of a radar target and/or a corresponding distance of the radar target.

8. The radar target simulator according to claim 7, wherein the signal generator comprises a controlled oscillator, and/or wherein the modulation frequency is set based on a relation between the ramp slope of the radar under test and a respective processing time of the radar target simulator.

9. The radar target simulator according to claim 7, wherein the signal generator is configured to function like a frequency-shifting unit for creating Doppler effects.

10. The radar target simulator according to claim 7, wherein the signal generator is configured to shift the radar target towards a corresponding beat frequency and/or towards a corresponding radar target range by setting the modulation frequency, and/or wherein the modulation frequency is based on a multiplication of the ramp slope of the radar under test by a difference between a respective processing time of the radar target simulator and a radar target time.

11. The radar target simulator according to claim 1, wherein the radar target simulator comprises an amplifier configured to set a gain with respect to a response signal to be transmitted to the radar under test.

12. The radar target simulator according to claim 1, wherein the radar target simulator comprises a transmitter configured to transmit a response signal to be transmitted to the radar under test.

13. The radar target simulator according to claim 1, wherein the receiver comprises one or more of an antenna, a third mixer, and an analog-to-digital converter, and/or wherein the transmitter comprises one or more of an antenna, a fourth mixer, and a digital-to-analog converter.

* * * * *